United States Patent
Brinkman

(10) Patent No.: US 12,398,938 B2
(45) Date of Patent: Aug. 26, 2025

(54) PORTABLE MULTI-FUNCTION AIR CONDITIONER WITH A LID-BASED FLUID PUMP

(71) Applicant: Solo Brands, LLC, Grapevine, TX (US)

(72) Inventor: John P. Brinkman, Abilene, TX (US)

(73) Assignee: Solo Brands, LLC, Grapevine, TX (US)

( * ) Notice: Subject to any disclaimer, the term of this patent is extended or adjusted under 35 U.S.C. 154(b) by 0 days.

(21) Appl. No.: 18/959,188

(22) Filed: Nov. 25, 2024

(65) Prior Publication Data

US 2025/0093089 A1    Mar. 20, 2025

Related U.S. Application Data

(63) Continuation of application No. 18/882,511, filed on Sep. 11, 2024, which is a continuation of application No. 18/778,374, filed on Jul. 19, 2024, now Pat. No. 12,130,065, which is a continuation of application No. 18/457,047, filed on Aug. 28, 2023, now Pat. No. 12,061,037.

(60) Provisional application No. 63/518,039, filed on Aug. 7, 2023.

(51) Int. Cl.
F25D 11/00    (2006.01)
F25D 17/06    (2006.01)

(52) U.S. Cl.
CPC .......... *F25D 11/003* (2013.01); *F25D 17/067* (2013.01)

(58) Field of Classification Search
CPC ...... F24F 5/0017; F25D 3/08; F25D 2303/08; F25D 17/067; F25D 11/003
See application file for complete search history.

(56) References Cited

U.S. PATENT DOCUMENTS

| | | |
|---|---|---|
| 2,760,347 A | 8/1956 | Dolza |
| 3,961,496 A | 6/1976 | Ku |
| 5,056,588 A | 10/1991 | Carr |
| 5,685,165 A | 11/1997 | Bigelow, Jr. |
| 6,026,653 A | 2/2000 | Presnell |
| 6,170,282 B1 | 1/2001 | Eddins |
| 6,182,463 B1 | 2/2001 | Strussion et al. |

(Continued)

FOREIGN PATENT DOCUMENTS

| | | |
|---|---|---|
| KR | 20080092993 A | 10/2008 |
| WO | 2006028473 A1 | 3/2006 |
| WO | 2013130643 A1 | 9/2013 |

OTHER PUBLICATIONS

Coolee, CL-240, https://www.coolboss.com/coolee-cl-240-portable-ice-chest-air-conditioner-bluetooth-player-5150019, 4 pages, retrieved Nov. 28, 2023.

(Continued)

*Primary Examiner* — Elizabeth J Martin
(74) *Attorney, Agent, or Firm* — Haynes and Boone, LLP

(57) ABSTRACT

A portable multi-function air conditioner comprises a fluid pump disposed in a lid associated with an insulated reservoir configured to hold a liquid and ice, a heat exchanger configured to cool air flowing through the heat exchanger. A fan may be configured to move air across the heat exchanger and discharge the air through an outlet port associated with one of the reservoir or the lid. A power connection may be carried on the lid and may provide power to the at least one pump.

20 Claims, 7 Drawing Sheets

(56) References Cited

U.S. PATENT DOCUMENTS

| | | |
|---|---|---|
| 6,227,004 B1 | 5/2001 | Gerstein |
| 6,293,121 B1 | 9/2001 | Labrador |
| 6,354,104 B1 | 3/2002 | Feagin |
| 6,357,243 B1 | 3/2002 | Efron |
| 6,568,202 B1 | 5/2003 | Hodges |
| 6,571,568 B1 | 6/2003 | Link |
| 6,886,360 B1 | 5/2005 | Rosenbaum |
| 7,143,589 B2 | 12/2006 | Smith |
| 7,155,924 B2 | 1/2007 | Zuckerman |
| 7,178,357 B2 | 2/2007 | Link |
| 7,188,489 B2 | 3/2007 | Martello |
| 7,246,505 B2 | 7/2007 | Navedo |
| 7,603,875 B2 | 10/2009 | Carr |
| 7,748,235 B1 | 7/2010 | Franklin |
| 7,805,958 B2 | 10/2010 | Bratcher |
| 7,814,764 B1 | 10/2010 | Heater |
| 7,886,548 B1 | 2/2011 | Graves |
| 8,176,749 B2 | 5/2012 | Lamere |
| 9,091,449 B2 | 7/2015 | Donaldson |
| 10,619,898 B2 | 4/2020 | Hollander |
| 2002/0078704 A1 | 6/2002 | Stich |
| 2005/0029030 A1 | 2/2005 | Ewert |
| 2005/0268622 A1 | 12/2005 | Krieger |
| 2008/0178629 A1 | 7/2008 | Meether |
| 2011/0030413 A1 | 2/2011 | Heil |
| 2013/0233002 A1* | 9/2013 | Donaldson ............ F24F 1/035 62/99 |

OTHER PUBLICATIONS

Coolee, CL-50R, https://www.coolboss.com/coolee-cl-50r-portable-ice-chest-air-conditioner-bludetooth-player-5150078, 3 pages, retrieved Nov. 28, 2023.

European Patent Office, European Search Report, Application No. EP 24 19 2526, Dec. 23, 2024, 5 pages, Munich.

* cited by examiner

PORTABLE MULTI-FUNCTION AIR CONDITIONER WITH A LID-BASED FLUID PUMP

PRIORITY

This application is a continuation of U.S. patent application Ser. No. 18/882,511, filed Sep. 11, 2024, which is a continuation of U.S. patent application Ser. No. 18/778,374, filed Jul. 19, 2024, now U.S. Pat. No. 12,130,065, which is a continuation of U.S. patent application Ser. No. 18/457,047, filed Aug. 28, 2023, now U.S. Pat. No. 12,061,037, which claims the benefit of the filing date and priority to U.S. Provisional Patent Application No. 63/518,039, filed Aug. 7, 2023, each of which is incorporated herein by reference in its entirety.

FIELD

The present disclosure is directed to air conditioning and, more particularly, to systems and methods relating to portable multi-function air conditioners.

BACKGROUND

Weather experienced in various climates and environments can reduce the enjoyment of certain activities and poses various dangers. High humidity and low humidity affect the body's ability to regulate temperature. For example, high humidity may cause excess perspiration, while low humidity may cause perspiration to dry quickly, both leading to dehydration. When high humidity or low humidity are coupled with hot weather or cold weather, overheating and hypothermia can occur. These dangers are most common when outside or in buildings that do not have air conditioning systems and/or heaters. Accordingly, there is a need to provide portable multi-function air conditioner in all environments.

SUMMARY

Consistent with some examples, a portable multi-function air conditioner comprises an insulated reservoir configured to hold a liquid and ice, a lid associated with the reservoir to provide selective access to the reservoir, a heat exchanger, at least one pump configured to move a first portion of the liquid through the heat exchanger as a first function and discharge a second portion of the liquid through a spray nozzle as a second function, a fan configured to move air across the heat exchanger, and discharge the air through an outlet port associated with one of the reservoir or the lid, the discharged air intermingling with the discharged second portion of the liquid to condition the air, and a power supply operatively coupled with and providing power to the at least one pump and the fan.

Consistent with some examples, a method for conditioning air using a portable, multi-function air conditioner having a reservoir and a lid that provides access to the reservoir comprises selectively performing a first conditioning function by moving a first portion of a liquid held in the reservoir through a heat exchanger using at least one pump, moving air across a heat exchanger using a fan, and discharging the conditioned air through an outlet port in the multi-function air conditioner using the fan. The method may further comprise selectively performing a second conditioning function by discharging a second portion of the liquid into the conditioned air from the multi-function air conditioner through a spray nozzle using the at least one pump.

Consistent with some examples, a multi-function air conditioner having a reservoir for holding a liquid and having a lid providing access to the reservoir is configured to condition air using a first portion of the liquid, discharge the conditioned air through the outlet port as a first function, and discharge a second portion of the liquid through a nozzle into the conditioned air as a second function.

Other examples include corresponding methods, computer systems, apparatus, and computer programs recorded on one or more computer storage devices, each configured to perform the actions described herein.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

Figure 1:
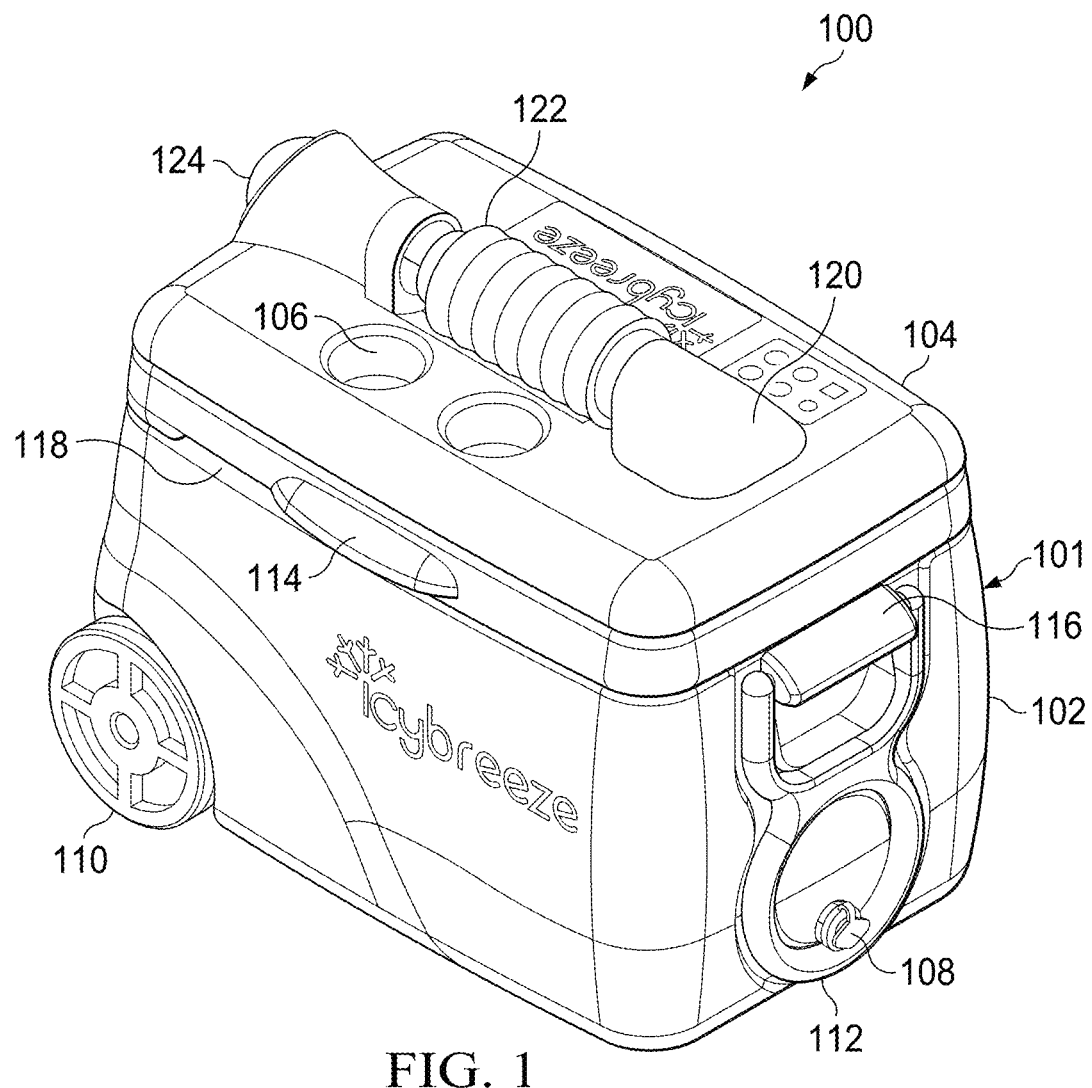
FIG. 1 is a perspective view of a portable multi-function, ice-based air conditioner usable in all environments, in accordance with an example of the present disclosure.

Examples of the present disclosure and their advantages are best understood by referring to the detailed description that follows. It should be appreciated that like reference numerals are used to identify like elements illustrated in one or more of the figures, wherein showings therein are for purposes of illustrating examples of the present disclosure and not for purposes of limiting the same.

DETAILED DESCRIPTION

Accordingly, the present disclosure contemplates system and methods for portable multi-function air conditioning in all environments.

For the purpose of promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more implementations or figures, when those same elements or features appear in subsequent figures, without such a high level of detail.

FIG. 1 is a perspective view of a portable multi-function air conditioner 100 usable in all environments, in accordance with an example of the present disclosure. The portable multi-function air conditioner 100 includes a chest 101 having a body 102 and a lid 104. The lid 104 may be hingedly connected to the body 102 to provide selective access to a reservoir 102 (shown in FIG. 2). The lid 104 may be connected in other ways, for example, the lid 104 may slide onto the body 102, or the body 102 have a clamshell opening, among other configurations. The body 102 and the lid 104 may comprise molded plastic or other suitable materials. The chest 101 can be configured to provide functions beneficial for coolers, ice chests, and other outdoor equipment. In one example, molded drink holders 106 may be defined in the lid 104. In some examples, a drain 108 is accessible from outside the body 102 and configured to drain liquid from the chest 101. The lid 104 may latch or lock to the body 102 to keep the contents within the chest 101 secured and cool.

The portable multi-function air conditioner 100 may be movable by way of wheels 110 and/or a tow handle 112. The wheels 110 and the tow handle 112 may be arranged differently than shown. There may be more or fewer of the wheels 110 and tow handles 112 than shown. In some examples, the tow handle 112 stows against the body 102 when not in use. The tow handle 112 may hinge outwardly to allow for lifting of a portion of the body 102. Once a portion of the body 102 is lifted, pulling on the tow handle 112 will allow for movement of the wheels 110. Additional handles may be included on the chest 101. In some examples, a lid handle 114 may be coupled to the lid to allow a user to open and close the lid 104. In some examples, lift handles 116 may be coupled to the body and allow a user to carry and transport the chest 101.

The chest 101 can be configured to hold liquid, air, and other objects such as ice, beverages, food, ice packs, etc. In some examples, the body 102 of the chest 101 has the reservoir 103 for holding the liquid, air, and/or other objects. The reservoir 103 may be defined by a liner separate from the body 102. In some examples, the body 102 itself defines the reservoir 103. The reservoir, like the body 102 and the lid 104, may be molded plastic or another suitable material. In some examples, the body 102 is insulated with insulation (not shown) between all or portions of the body 102 and the reservoir 103. The insulation may be foam or other suitable materials. In some examples, the portable multi-function air conditioner 100 may also function as a beverage cooler or ice chest, which may call for additional structure or organization of components within the reservoir 103.

In some examples, warm air is drawn into the reservoir 103 of the portable multi-function air conditioner 100 through at least one inlet 118. The at least one inlet 118 can be located at the conjunction of the lid 104 and the body 102. Such a location may allow the at least one inlet 118 to be hidden from plain view and allows air to enter the chest 101 even when a substantial amount of ice, liquid, food, drinks, or other objects are located in the reservoir 103. In some examples, the inlet 118 is placed on the front of the chest while another inlet 118 is placed on a side of the chest opposite the fan. Placing inlets away from and opposite a fan 304 (shown in FIG. 3) ensures that air flows across the cold objects within the reservoir 103. As air moves across these cold objects, the temperature of the warm air begins to decrease, before continuing throughout the rest of the system.

In some examples, the at least one inlet 118 may be configured to allow air to enter the chest 101 when suction force is applied by the system (e.g., when a fan is pulling air from within the chest 101) but prevents air from exiting the chest 101 when the suction force subsides (e.g., when the fan is off). In this sense, the at least one inlet 118 may act as a one-way valve. The at least one inlet 118 of this nature ensure that cold air within the chest 101 does not escape, increasing the time it takes for ice within the chest 101 to melt.

The chest 101 may have an outlet port 120, a flexible tube 122, and a vent 124, which facilitate the movement of cooled air and/or liquid out of the chest 101. These features will be discussed in more detail below with respect to FIG. 3.

Figure 2:
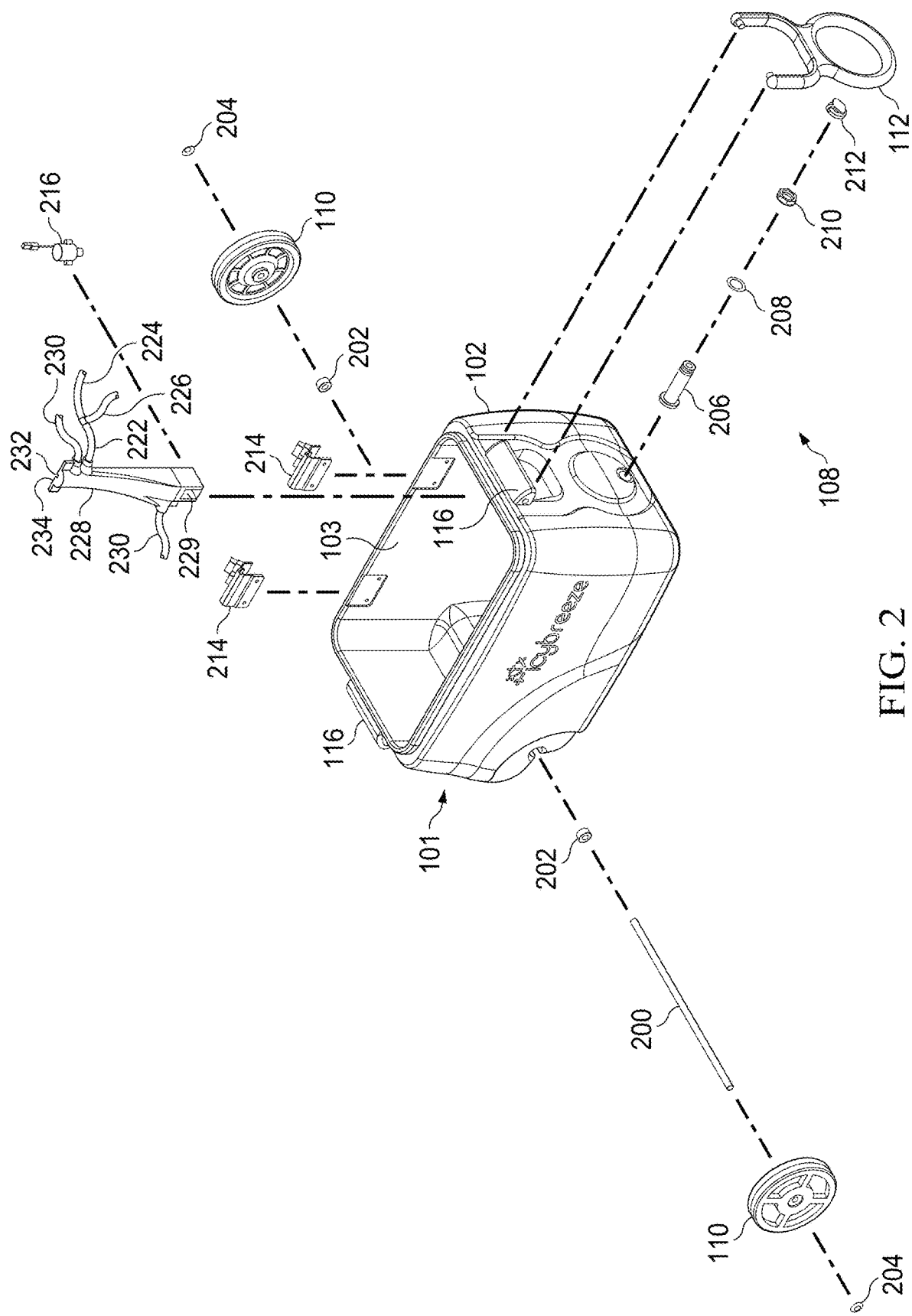
FIG. 2 is an exploded perspective view of a chest of a portable multi-function air conditioner usable in all environments, in accordance with an example of the present disclosure.

FIG. 2 is a perspective view of the chest 101 of the portable multi-function air conditioner 100 usable in all environments, in accordance with an example of the present disclosure. As shown, two hinges 214 can straddle the inside of the reservoir 103 and the outside of the body 102 and hingedly connect to the lid 104. More or less than two of the hinges 214 can be used to attach the lid 104 to the chest 101. Other forms of attachment are also possible, including the forms described above with respect to FIG. 1.

In some examples, the body 102 may be molded to accept an axle 200 attached to the wheels 110. The wheels 110 may be attached to the axle 200 by bushings 202. The wheels 110 may be held in place by caps 204. In some examples, the wheels 110 are detachable from the body 102, rather than integrated as shown. In some examples, the drain 108 has a drain body 206 that traverses from inside the reservoir 103 to outside the body 102. The drain body 206 may be retained in place by a gasket 208 and a nut 210. A drain plug 212 may be provided for opening and closing the drain 108.

Liquid, air, and other objects can be held by the reservoir 103. The reservoir 103 may hold ice, drinks, liquid (e.g., water), food, and other objects, depending on the circumstances. When the reservoir 103 is filled with ice, the insulative properties of the portable multi-function air conditioner can maintain the ice in a solid state for an extended period of time. The ice or other chilled objects within the reservoir 103 will cool the warm air drawn into the chest 101 as the air passes across it. The air can further be cooled by systems and methods described herein. It is understood that the portable multi-function air conditioner 100 can alternatively be filled with hot liquid or objects and be used during times of cold weather to discharge warm air and/or warm liquid.

In some examples, a pump 216 is situated within the reservoir 103. To ensure that all of the fluid can be pumped out of the reservoir 103, it may be beneficial to place the pump 216 in a lower portion of the reservoir 103. In some examples, the pump 216 is used to move liquid from within the reservoir 103 to the lid 104. Particularly, the pump 216 may move the liquid from the reservoir 103 to a heat exchanger 218 (shown in FIG. 3). Additionally, the pump 216 may move liquid to a spray nozzle 220 (also shown in FIG. 3) to be discharged from the chest 101. In some examples, to move liquid from the reservoir 103 to the heat exchanger 218 or the spray nozzle 220, the pump moves the liquid through liquid conduit 222. The liquid conduit 222 may branch into a heat exchanger intake conduit 224 and a spray nozzle conduit 226. In some examples, there are more than one of the liquid conduit 222, where one of the liquid conduit 222 acts separately as the heat exchanger intake conduit 224 and another of the liquid conduit 222 acts as the spray nozzle conduit. In such an example, one or more pumps may be used to move fluid through the heat exchanger intake conduit 224 and the spray nozzle conduit 226. The use of more or fewer of the liquid conduit 222 may be beneficial to minimize pressure inconsistencies throughout the system. The pump 216 may be a 12-volt electrically powered impeller-based pump and may have a flow rate of around 3 liters per minute.

In some examples, the pump 216 is protected and/or held in place by a cover 228. The pump 216 may draw in cooled liquid through an opening 229 in the cover 228. Both the pump 216 and the opening 229 may be near a lower portion of the cover 228 and be situated relatively low in the reservoir 103. This allows the pump 216 continuous access to the cooled liquid in the reservoir 103 even if most of the liquid has already exited the chest 101. The cover 228 may attach to the interior of the reservoir 103, the pump 216 being situated inside the cover 228 when it is installed. The cover 228 provides protection for the liquid conduit 222 that attached to the pump 216 for moving liquid to the heat exchanger 218 and/or the spray nozzle 220.

In some examples, the cover also provides protection for a return conduit 230. The return conduit 230 may traverse all or a part of the length of the cover 228 before exiting. In some examples, a length of the return conduit 230 extends away from the cover 228 to return liquid some distance away from the pump 216. The return conduit 230 may return liquid back to the reservoir 103 after it has passed through the heat exchanger 218. This allows for a continuous heat exchanging system whereby the fins of the heat exchanger 218 are continually supplied with new cool liquid for transferring heat away from the warm air. It may be beneficial to return liquid away from the pump 216 so that the liquid can mix with the rest of the liquid in the reservoir 103 and drop in temperature before being sucked into the heat exchanger 218 again. In some examples, the liquid in the return conduit 230 may pass through another heat exchanger before being returned to the reservoir 103, as explained further below with respect to FIG. 6. In other examples, it may be desirable for the liquid that passes through the heat exchanger 218 to be interoperable with other functions of the portable multi-function air conditioner 100, such as the spray nozzle described herein.

In some examples, the opening 229 is configured to filter and prevent debris present within the reservoir 103 from entering the liquid conduit 222. Additionally, a separate filter (similar to the one shown below in FIG. 3) may be used to filter the liquid prior to its entry into the heat exchanger 218 and/or the spray nozzle conduit 226. The filter may be positioned along the liquid conduit 222 such that the liquid is filtered before splitting between the heat exchanger intake conduit 224 and the spray nozzle conduit 226.

From the foregoing, it will be appreciated that, particularly where the portable multi-function air conditioner 100 also serves as a beverage cooler or the like, the cover 228 safely stows and routes the pump 216, the liquid conduit 222, and the return conduit 230, and/or other components (e.g., filters) and conduits.

Figure 3:
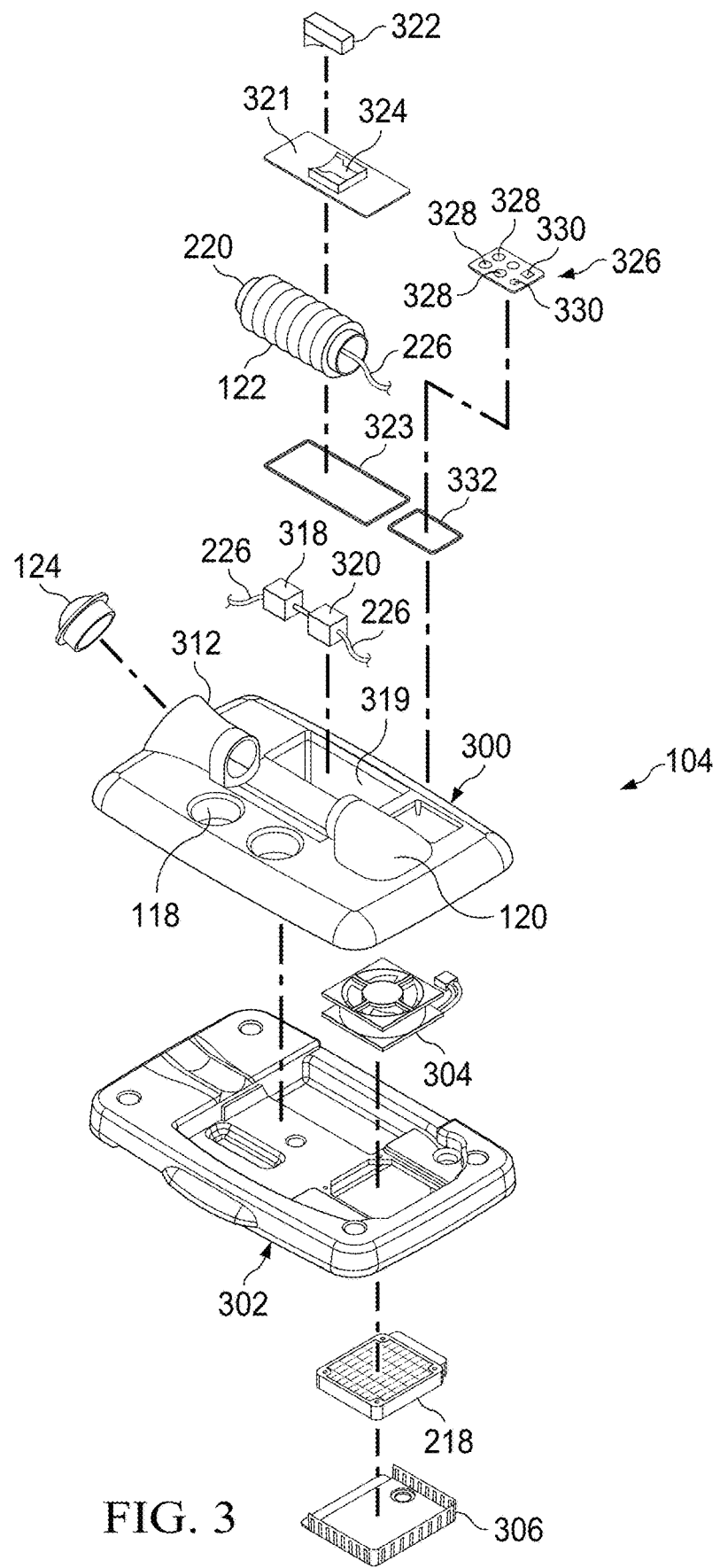
FIG. 3 is an exploded perspective view of a lid of a portable multi-function air conditioner usable in all environments, in accordance with an example of the present disclosure.

FIG. 3 is an exploded perspective view of the lid 104 of the portable multi-function air conditioner 100 which is usable in all environments, in accordance with an example of the present disclosure. The lid 104 may comprise an upper shell 300 fitted with a lower shell 302. In some examples, the upper shell 300 and the lower shell 302 may comprise a molded plastic material and may fit together via fasteners, interference fit, electronic welding, or other means. A major function of the lid is to retain a significant number of components associated with the air cooling and/or heating function of the portable multi-function air conditioner 100. Like the chest 101, the lid 104 may include insulation (not shown) between all or portions of the upper shell 300 and the lower shell 302. The insulation may be foam or other suitable materials.

In some examples, the heat exchanger 218 may be attached to the lower shell 302 and/or the upper shell 300. The heat exchanger 218 may be made from aluminum or another material with good thermal conductive properties. The pump 216 described above with respect to FIG. 2 can move cool liquid (e.g., water) from the reservoir 103 through the liquid conduit 222, through the heat exchanger intake conduit 224, and into and through the heat exchanger 218. The cool liquid can cool fins of the heat exchanger 218, the cooled fins allowing for heat transfer to occur between the heat exchanger 218 and air passing across it. In some examples, an exchanger cover 306 may protect and surround the heat exchanger 218 to filter the air and prevent clogging and/or buildup on the heat exchanger 218 as air travels across it. After the cool liquid passes through the heat exchanger 218 it may return to the reservoir 103 by way of the return conduit 230.

In some examples, the fan 304 is housed between the upper shell 300 and the lower shell 302. The fan 304 may be an electronic fan. The fan 304 may be positioned in close proximity to the heat exchanger 218, so that the fan can draw/push air from within the reservoir 103 across the heat exchanger 218. As air passes across the heat exchanger 218, the air will lose heat to the fins, due to the temperature difference between the heat exchanger 218 and the air. In some examples (e.g., cold weather), where warm liquid is used to condition the air, the heat exchanger 218 containing warm liquid will lose heat to the air so that a warm stream of air can be sent from the chest 101. In some examples, multiple heat exchangers or reversible/dual-function heat exchangers may be used to perform both the cooling and heating functions.

After pulling/pushing the air into the heat exchanger 218, the fan 304 can further route and discharge the conditioned air through the outlet port 120 defined in the lid 104. The outlet port 120 may be defined by other components of the chest 101 or the lid 104 and may be positioned in different positions than shown. In some examples, the outlet port 120 may be located on an upper portion of a side of the chest 101 to direct air laterally outwards at a subject positioned nearby. The outlet port 120 may take a variety of forms depending on where it is desirable to direct the conditioned air. As shown in FIG. 1, the outlet port 120 may be curved such that the conditioned air is directed across the top of the lid 104. In some examples, it may be desirable to direct the conditioned air upwards or laterally away from the lid 104. The diameter and shape of the outlet port 120 will affect the pressure and shape of the airstream that exits the chest. For examples, a smaller outlet port 120 may create higher pressure and discharge air at a higher velocity.

The fan 304 may be a 12-volt direct current fan with a capacity of 226 cubic feet per minute. In some examples, the fan 304 may be adapted from a 105 mm PC case fan, sourced from another fan, or it may be custom fan constructed for use with the portable multi-function air conditioner 100. The fan 304 could also be an alternating current fan, depending on the battery and control panel used. The fan 304 can be located at various locations about the lid 104. In some examples, the fan 304 is located above the heat exchanger 218 and pulls air from within the reservoir 103 across the heat exchanger 218. In some examples, the fan 304 is located below the heat exchanger 218 and pushes air from within the reservoir 103 across the heat exchanger 218.

In the example shown in FIG. 3, the fan 304 and the heat exchanger 218 are retained within the lid 104. The heat exchanger 218 and the fan 304 may be attached to the lid 104. For example, the heat exchanger 218 can be attached to the interior of the lid 104 while the fan 304 is positioned within the lid 104. It may be advantageous for the heat exchanger 218 to be positioned on the interior of the lid 104 such that it is in direct communication with the reservoir 103. The heat transfer occurring between the heat exchanger 218 and the air passing across the heat exchanger 218 can cause condensation to occur. When the heat exchanger 218 is in direct communication with the reservoir, condensation can drip directly back into the reservoir, and the fluid can be recirculated throughout the system. However, it is understood that, in other examples, it may be advantageous for the fan 304 and the heat exchanger 218 to be located in another portion of the portable multi-function air conditioner 100 (e.g., located in the reservoir 103).

In some examples, the flexible tube 122 can be connected to the outlet port 120 to further direct the discharged stream of air in a direction preferred by the user. The flexible tube 122 can be of any desired length and can be detachable from the outlet port 120. The user may manipulate the orientation of the flexible tube 122 by hand. In some examples, the orientation of the flexible tube 122 can be controlled electronically or automatically. In some examples, the flexible tube may move back and forth or oscillate between orientations, like a fan, to provide air-conditioned air in a plurality of directions repetitively. The flexible tube 122 can connect to the outlet port 120 in a variety of ways, for example, the flexible tube 122 could snap into place or could slide into the outlet port 120 and be secured under compression from the outlet port 120.

In some examples, the flexible tube 122 can be connected to an air shaft 312 which may include the vent 124. Like the outlet port 120, the flexible tube 122 and the air shaft 312 can connect in a variety of manners, such that the user can easily connect and disconnect the two to switch between functions and configurations. The air shaft 312 may further direct the air in a particular direction certain direction and out the vent 124. The vent 124 can variably control the amount of air and the angle at which air is discharged. For example, the vent 124 may have rotatable shutters that control the angle and the amount of air that is discharged. In some examples, the flexible tube 122 can expand and retract. For example, when the flexible tube 122 is connected to both the outlet port 120 and the vent 124, the flexible tube is in a retracted position. When the flexible tube 122 is disconnected from the air shaft 312, the flexible tube 122 can expand to a variety of lengths, so the air being pushed through the flexible tube 122 can travel a greater distance before being discharged to a specific location.

The portable multi-function air conditioner 100 is not only able to discharge temperature-controlled and humidity-controlled air but can spray and mist droplets of liquid. This feature expands the functions and capabilities of the system. When combined with the features previously described, the portable multi-function air conditioner is a versatile air conditioning system usable in all environments. In some examples, the cooled liquid drawn up through the liquid conduit 222 can also run through the spray nozzle conduit 226 to be discharged through the spray nozzle 220. The discharged air can intermingle with the discharged liquid, which further conditions the air. In some examples, a spray pump 318, such as a high-pressure pump, can move the liquid from the liquid conduit 222 and the spray nozzle conduit 226 out of the spray nozzle 220. The spray nozzle 220 is configured to spray a mist of liquid. Depending on certain variables within the system, the preferred orifice diameter of the spray nozzle 220 may range for 0.05 mm to 0.35 mm, for example, 0.05 mm, 0.1 mm, 0.15 mm, 0.2 mm, 0.25 mm, 0.3 mm, or 0.35 mm. Changing the orifice diameter of the spray nozzle 220 can affect the spray radius and/or the droplet size of the liquid that is discharged, among other things.

In some examples, the spray pump 318 can be situated in a compartment 319 recessed in the lid 104. To ensure that the spray pump 318 remains dry and can function in all environments, the compartment 319 can be provided with a compartment cover 321. A cover seal 323 (e.g., gasket, o-ring, etc.) may be provided to seal the compartment cover 321 over the spray pump 318 within the compartment 319. The compartment cover 321 can be removable fixed to the lid by screws or other means to allow for replacement of the spray pump 318 or other components within the compartment 319.

In some examples the spray nozzle conduit 226 runs out the outlet port 120 and through the flexible tube 122 to a distal tip of the flexible tube 122. In some examples, like the flexible tube 122, the spray nozzle conduit 226 can expand and retract, with the expansion and retraction of the flexible tube 122 when the flexible tube is disconnected from either the air shaft 312 or the outlet port 120. In other examples, the spray nozzle conduit 226 exits the chest 101 from a different outlet port than the outlet port 120. The spray nozzle 220 may be fixed and centered about the circumference of the flexible tube 122. Centering the spray nozzle 220 about the circumference of the flexible tube 122 may ensure that the sprayed liquid is projected symmetrically and evenly outward when coupled with the stream of air flowing through the flexible tube 122. In some examples, the spray nozzle 220 may be fixed to a side of the flexible tube 122. The spray nozzle 220 may extend beyond the distal tip of the flexible tube 122 or may stop short of the end of the distal tip of the flexible tube 122 such that it is hidden from view. When the spray nozzle 220 extends through the flexible tube 122 and/or is fixed to a distal end of the flexible tube 122, it prevents excess liquid from getting stuck within the flexible tube 122, thereby minimizing mold, mildew, and other difficulties resulting from stagnant liquid in a confined space.

In some examples, the spray nozzle conduit 226 need not run through the flexible tube 122 and can be positioned separate from the flexible tube 122 such that the air in the flexible tube 122 and the sprayed liquid from the spray nozzle 220 can be routed in different directions.

In some examples, a filter 320 may be included to filter the liquid running through the spray nozzle conduit 226. The filter 320 may filter the liquid within the spray nozzle conduit 226 before the liquid reaches the spray pump 318. The filter 320 may include a paper filter cartridge. Other types of filters may be used. In some examples, the filter 320 is located in the compartment 319 next to the spray pump 318. By filtering the liquid before it reaches the spray pump 318 and before it reaches the spray nozzle 220 can prevent the spray nozzle 220 and/or the spray pump 318 from clogging and can extend their life before they need to be cleaned or replaced. In the example shown, the spray nozzle 220 is removable and replaceable. The spray nozzle 220 may rotatably couple to a fixture (not shown) which connects the spray nozzle conduit 226 to the distal end of the flexible tube 122. The removable nature of the spray nozzle 220 allows for the use of a new nozzle if the spray nozzle 220 becomes clogged, dirty, or wears out. In some examples, the spray nozzle 220 rotatably couples directly to the spray nozzle conduit 226, for example, when the spray nozzle conduit 226 is not fixed to the flexible tube 122.

In some examples the spray nozzle 220 is adjustable so that the diameter of the spray and/or the size of the liquid droplets varies, depending on the use. In some examples, the spray nozzle 220 does not spray or mist the liquid, but rather, squirts it in a continuous stream. This may be desirable for cooling a subject at a faster rate or for a certain aesthetic affect. In some examples, the stream of liquid from the spray nozzle 220 can resemble the stream from a hose or a squirt gun.

The spraying and misting function of the portable multi-function air conditioner 100 can occur simultaneously or separately from the air conditioning function. When occurring together the stream of air discharged from the chest 101 may help to carry and spread the misted liquid further than it normally would. This allows the sprayed liquid to cover a larger area, providing more reliable and constant relief from the dangers of the environment. A directable stream of cool and moist air can be directed in any direction the user desires to relieve the subject from the dangers of hot weather, or to create a more comfortable environment, even if not in present danger. The spraying and air functions need not be performed together, as described further below.

In some examples, the compartment 319 may also house a battery 322 or other power supply. The battery can be located elsewhere (e.g., in the reservoir 103, attached to the exterior of the lid 104, etc.) In the example shown in FIG. 3, the battery 322 removably attachable to battery terminal(s) 324 fixed to the compartment cover 321. The battery 322 may be a rechargeable battery based on nickel-cadmium, nickel-metal hydride, lithium, or other battery technology. The battery 322 may have a charge indicator that indicates a level of charge of the battery 322. In some examples, when the user presses a button, a level of charge is indicated by the lighting of one or more LEDs. Other forms of charge indicators can be implemented. In some examples, the battery 322 is a 12-volt battery with a capacity of 10,000 mAh. Provisions may also be made for an A/C or DIC adapter (no shown) to recharge the battery 322 and/or power the portable multi-function air conditioner 100. The compartment 319 may be configured to accept a number of disposable-type batteries such as a lantern battery, D-cells, or the like.

In some examples, as shown in FIG. 3, a control panel 326 is housed at least partially within the upper shell 300 and/or the lower shell 302. The control panel 326 allows the user to provide an input and control the functions and settings of the portable multi-function air conditioner 100. The control panel 326 may include buttons 328 for selecting various settings, which activate and deactivate various components of the system (e.g., the fan 304, the heat exchanger 218, the spray pump 318, the pump 216, the spray nozzle 220, etc.). The control panel 326 may be accessible from outside the lid 104. In some examples, the control panel is accessible when the lid 104 of the chest 101 is opened. The control panel may also be located in the body 102 of the chest. The control panel may be operable remotely or via a corded controller, rather than at the chest 101, as described in more detail with respect to FIG. 4.

In some examples, the speed of the fan 304 is variable. The speed of the fan 304 may have three or more speed settings, for example, a low speed setting, a medium speed setting, and a high speed setting. Additionally, the fan 304 may be set to blow air for a certain period of time, for example, 1 minute, 5 minutes, 10 minutes, 15 minutes, 30 minutes, 45 minutes, 1 hour, etc.

In some examples, the rate of cooling of the air performed by the heat exchanger 218 is variable. For instance, the button(s) 328 on the control panel 326 can activate an "extreme cool" function to increase the air conditioning capabilities and maximize the difference in temperature of the air discharged from the chest compared to the ambient temperature. When the "extreme cool" setting is activated, the pump 216 may be engaged. When the pump 216 is engaged, the rate at which the heat exchanger circulates cool liquid through the heat exchanger 218 may be increased or maximized, thereby increasing the amount of heat transferred from the air and into the surface area on the heat exchanger 218. When "extreme cool" is not needed or not desired, the "extreme cool" setting can be deactivated and the rate at which the pump 216 pulls in cool liquid into the heat exchanger 218 may be lowered or stopped. When the heat exchanger 218 cycles through the cool liquid at a slower rate, the air will not be cooled to the same degree. However, using less or none of the cooled liquid in the chest 101 will lengthen the amount of time that any ice stays frozen or cold objects remain cold. In some examples, the rate of cooling is selectable with a dial or there may be any number of cooling settings. The variability and versatility of these and other aspects of the portable multi-function air conditioner 100 allow for function and successful use in all climates and environments.

The control panel can be designed in a water-proof and weather-resistant manner to allow the portable multi-function air conditioner 100 to be safely used outdoors and in all environments. The control panel 326 may be sealed into the upper shell 300 via a control panel seal 332 (e.g., gasket, o-ring, etc.).

In some examples, the control panel 326 is fitted with any number of ports/connectors 330 (e.g., USB ports, DC connectors, coaxial connectors, etc.) to charge mobile or other devices. This charging function increases the versatility of the portable multi-function air conditioner 100. Due to the insulative properties of the chest 101, ice can remain frozen for many days within the reservoir 103. In some instances, the ice may remain frozen longer than a mobile device can maintain a charge. In situations where the portable multi-function air conditioner 100 is being used for extended periods of time, for example, when camping, or at sporting tournaments, it is advantageous to be able to charge a device while not having to return from the remote location.

In some examples, the pump 216, the spray pump 318, the fan 304, the heat exchanger 218, and/or other electrical components, may be powered by a power supply. The power supply may be in the lid 104 or elsewhere. It may be necessary to route a power connection 232 (shown in FIG. 2) from the power supply and the control panel 326 to the various components.

Specifically, with respect to the pump 216, which may be located in the lower portion of the reservoir 103, the power connection 232 may need to travel a distance to the lower portion of the reservoir 103. The power connection 232 may be in the form of a power cable. A small power opening 234

(shown in FIG. 2) may be defined by an upper portion of the cover 228 for passing the power connection 232 down from the power supply. In some examples, where the cover 228 is located near a hinge 214, the hinge may serve as a form as protection for the power connection 232. Other positions and methods for supplying power to the various components are possible. For example, the power connection 232 could extend within the body 102 to reach the pump 216 in the lower portion of the reservoir 103. Such a configuration may provide protection for the power connection 232. With respect to the spray pump 318, another power connection 232 may run from the power supply and the control panel 326 into the compartment 319 to connect to the spray pump 318.

Figure 4:
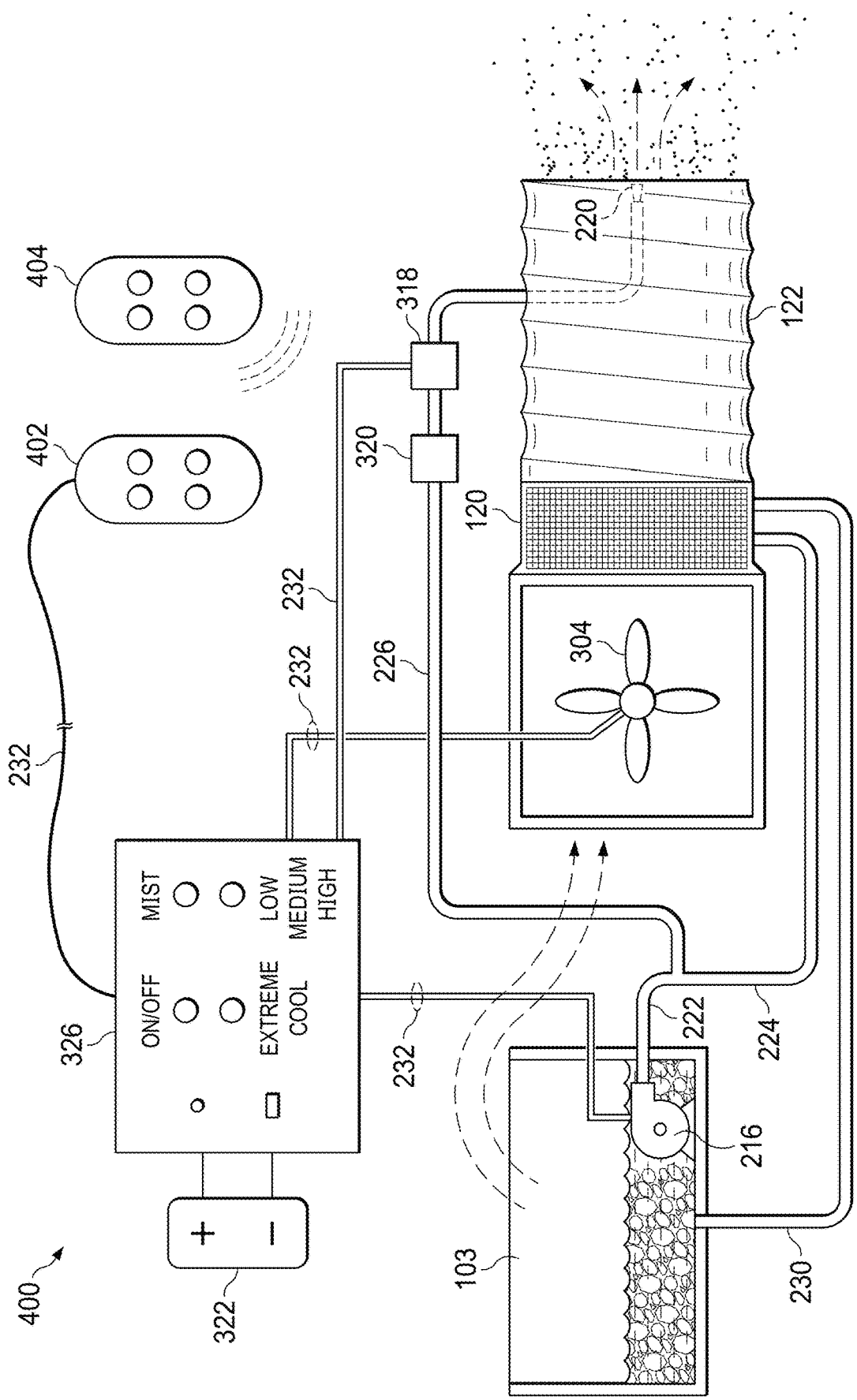
FIG. 4 is a schematic diagram of a portable multi-function air conditioner usable in all environments, in accordance with an example of the present disclosure.

FIG. 4 is a schematic diagram of a portable multi-function air conditioner 400 usable in all environments, in accordance with an example of the present disclosure. As shown, the control panel 326 can be attached to the battery 322. The power connection 232 may connect the control panel 326 to the pump 216 located in the lower portion of the reservoir 103. The power connection 232 may also connect the control panel 326 to the spray pump 318. Additionally, the power connection 232 may connect the control panel 326 to the fan 304. The reservoir 103 is filled with ice and cool liquid, the cool liquid resulting from melting of the ice. The liquid conduit 222 extends from the pump 216 and splits into two separate conduits, the heat exchanger intake conduit 224 and the spray nozzle conduit 226. The heat exchanger 218 is filled with cool liquid from the heat exchanger intake conduit 224. After the cool liquid circulates through the heat exchanger 218, it may return from the heat exchanger 218 to the reservoir 103 by way of the return conduit 230. The fan 304 pulls air from the reservoir 103 and pushes the air through the heat exchanger 218. The fan 304 can be located on either side of the heat exchanger 218. For example, when the heat exchanger 218 is located between the reservoir 103 and the fan 304, the fan pulls the air from the reservoir 103 and through the heat exchanger 218. As the cool air passes across the heat exchanger 218, the air loses heat to the heat exchanger 218 and becomes even cooler. The cold air may be discharged from the chest 101 through the outlet port 120. The flexible tube 122 connected to the outlet port 120 routes the cold air in a desired direction. Meanwhile, liquid in the spray nozzle conduit 226 is moved through the filter 320. The spray pump 318 pushes the liquid forcefully out of the spray nozzle 220. The cold air exiting the flexible tube 122 coupled with the spray from the spray nozzle 220 creates a consistently cold stream of moist airflow.

The control panel 326, as described above with respect to FIG. 3, includes one or more buttons for selecting the and controlling the multiple functions of the portable multi-function air conditioner 100. The control panel 326 can be integrated into the chest 101. It is understood that the control panel 326 is not limited to buttons. Other types of switches may provide similar control (e.g., rotary knobs, switches, rocker and/or toggle switches, etc.). The control panel 326 may act as a variable switch between the battery 322 and the fan 304 to provide varying amounts of power or current via power connections 232 to the various components. In this regard, the control panel 326 is capable of functioning as a switch between the battery 322 and the various components. However, the control panel 326 may also function as part of a relay circuit. In some examples, the control panel 326 and/or the battery 322 may provide a level of power or current to the pumps and fan to keep the system operating efficiently and to continuously provide the heat exchanger with chilled or heated liquid. In some examples, the control panel 326 may also selectively control the speed of the pump 216 and the spray pump 318.

Alternatively, a wired remote 402 can control the multiple functions. Furthermore, in some examples, a wireless remote 404 can control the multiple functions, employing a wireless communication technology. The wired remote 402 and the wireless remote 404 can be used instead of or in addition to the control panel 326. Remote operation allows a user to control the system without having to be nearby, or without having to fully divert attention away from another task. For example, the portable multi-function air conditioner 100 may be controlled from the driver's seat of a vehicle, from a lawn chair, from a pilot's seat of an aircraft, from the front seat of a golf cart, etc. The wireless remote 404 can provide similar controllability as the wired remote 402 and the control panel 326, but possible in a more convenient fashion.

The portable multi-function air conditioner 100 described herein may comprise various conduits, hoses, and pathways as known to one skilled in the art for being suitable for transporting cooled and/or heated liquid.

It is appreciated that in operation, a user may fill the portable multi-function air conditioner 100 with ice, cold water, hot water, or hot objects, which will be maintained in its state by the insulating properties of the reservoir 103. It is contemplated that users may place beverages or other food items within the reservoir 103. As long as a minimal volume of liquid is allowed to remain in the reservoir 103, the liquid may be pumped by the pump 216 to the heat exchanger 218 where the fan 304 can utilize the same for changing the temperature of the air. The conditioned air and the mist can then be directed via the outlet port 120, the flexible tube 122, the air shaft 312, and/or the vent 124 to a location desired by the user.

The portable multi-function air conditioner 100 described herein may be wheeled or carried to a desired location and can be activated for providing the cool functions. As the portable multi-function air conditioner 100 utilizes the cooling capacity of the internally stored ice and/or water, the cooling capabilities may fall to an unacceptable level over a period of time. However, a user can add more ice and/or drain some the of existing liquid via the drain 108. Typical ice-storing coolers need to be drained at the end of their use. However, using the systems and methods described herein, the liquid from within the chest will be discharged in the form of spray or mist. Accordingly, the need to drain the liquid from ice coolers is eliminated or substantially reduced.

Throughout the present disclosure, use of liquids is discussed for use in the air cooling and spraying functions of the portable multi-function air conditioner 100. In some cases, this liquid can be water, or ice water. It is understood that crushed or block ice can be used. In other examples, the ice may be sequestered from the liquids that are allowed to flow. For example, cold packs, ice packs, or even dry ice may be used to chill the liquid which is sent through the heat exchanger 218 and other components for cooling the air. In some examples, other efficient coolants can be used, such as ethylene glycol mixtures. Efficient coolants may be sequestered from water within the reservoir 103. The efficient coolants can be circulated through the radiator while the water is pumped to the spray nozzle 220. This allows system to utilize coolants more efficient than water for cooling purposes, while still allowing the chest 101 to function as a ice chest or beverage cooler.

In other instances, the liquid may be scented and/or contain various chemicals such as DEET for repelling insects and other animals. A scented liquid may provide further enjoyment or ambiance. Other scents may be usable to deter animals while camping. Similarly, insect repellant or sunscreen can be sprayed into the air or onto a person. Compared to normal methods for applying insect repellant, the portable multi-function air conditioner 100 allows for convenient and complete coverage. In some examples, where a user wishes to melt ice within the cooler faster than the ambient temperature could, the user can add salt to the reservoir 103 to speed up the process.

Figure 5:
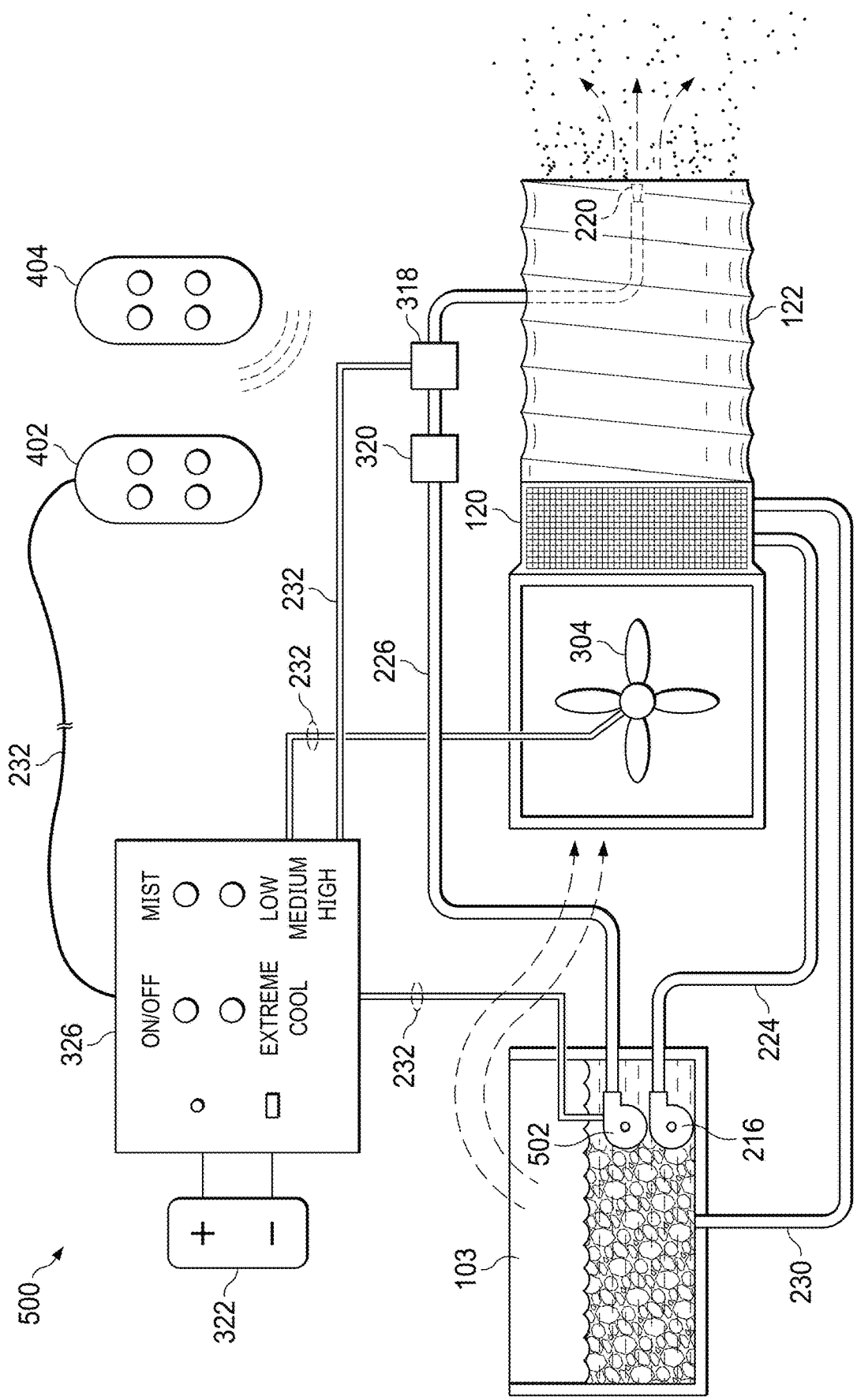
FIG. 5 is a schematic diagram of a portable multi-function air conditioner usable in all environments, in accordance with an example of the present disclosure.

FIG. 5 is a schematic diagram of a portable multi-function air conditioner 500 usable in all environments, in accordance with an example of the present disclosure. The portable multi-function air conditioner 500 may have a similar appearance and design as the portable multi-function air conditioners shown in FIGS. 1-4. However, rather than using the pump 216 to pull liquid from the reservoir 103, another pump 502 can be employed. Pump 502 may be a dedicated pump for driving water to the spray nozzle 220. In some examples, the spray pump 318 may or may not be needed. The pump 502 which can be located in the reservoir 103 near the pump 216 may replace the spray pump 318, which may be located in the lid. Employing two pumps 216 and 502 and having the separate heat exchanger intake conduit 224 for the cooling liquid and the separate spray nozzle conduit 226 for the liquid be sprayed out of the spray nozzle 220 may allow the system to more accurately keep pressures within the conduits 226, 224 at desirable levels. Furthermore, keeping the liquid separated between the spray nozzle conduit 226 and the heat exchanger intake conduit 224 may be beneficial when using various coolants and when creating a closed system for the cooling liquid when using an additional heat exchanger to re-cool the cooling liquid that has already passed through the heat exchanger, as explained more fully below with respect to FIG. 6.

Figure 6:
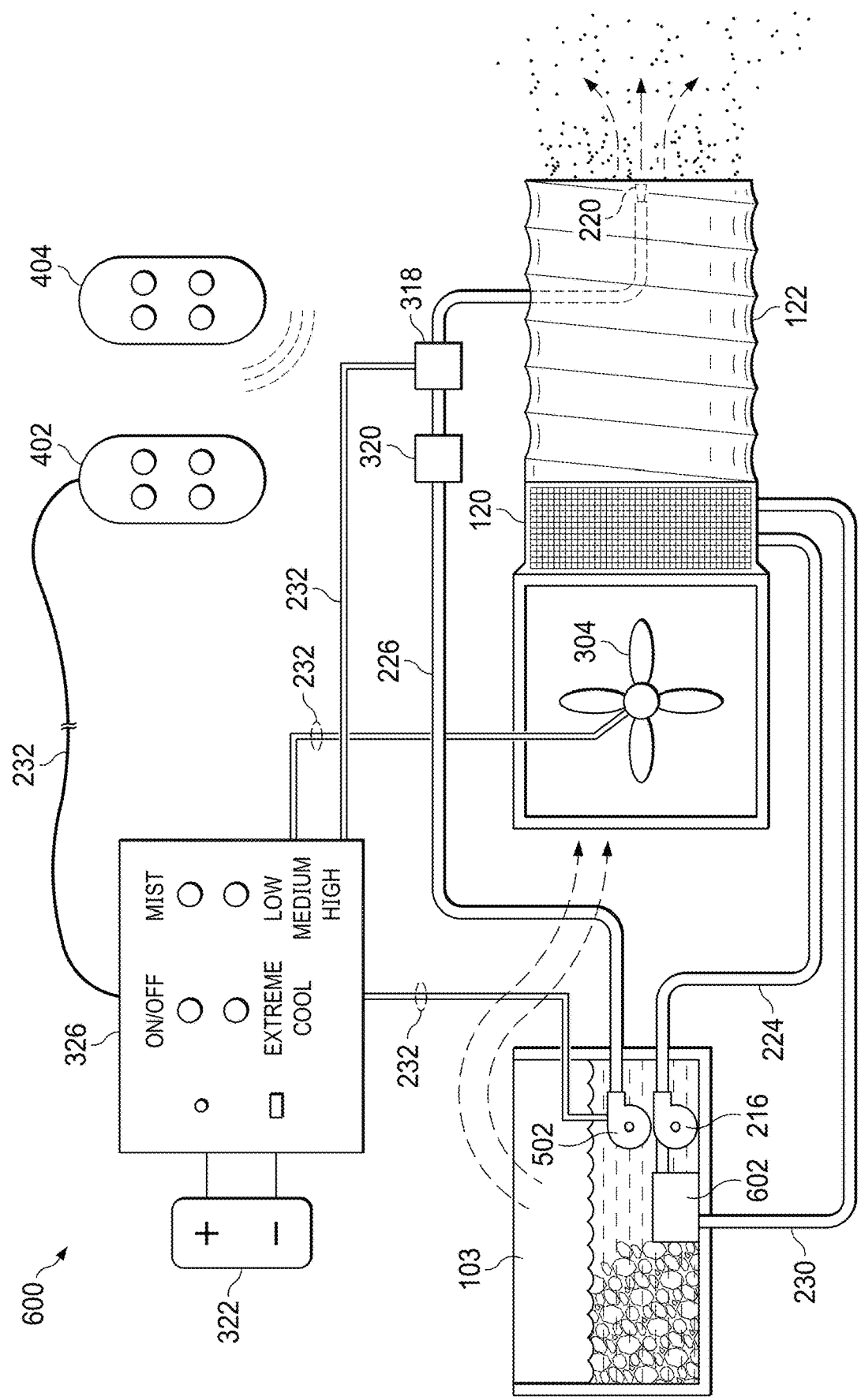
FIG. 6 is a schematic diagram of a portable multi-function air conditioner usable in all environments, in accordance with an example of the present disclosure.

FIG. 6 is a schematic diagram of a portable multi-function air conditioner 600 usable in all environments, in accordance with an example of the present disclosure. The portable multi-function air conditioner 600 may have a similar appearance and design as the portable multi-function air conditioners shown in FIGS. 1-5. However, rather than exhausting the liquid in the return conduit 230 directly into the reservoir 103, the liquid can be pushed through a second heat exchanger 602. The second heat exchanger 602 may be submerged in the reservoir 103 and exposed to the liquid and solids therein (e.g., water, ice, cold packs, etc.). The liquid passed through the second heat exchanger 602 will be re-chilled before being pumped by the pump 216 back into the heat exchanger 218 or returned back into the reservoir 103. Sequestering the liquids for cooling from the liquids accessible by the user may be beneficial for various reasons. If other coolants are used, the coolants will not contaminate the water and ice in the chest 101. Even when cooled water is used, sequestering the cooling water from the other items in the chest 101 will prevent any contaminants from the radiator and/or pipes and tubes of the system from blending back with the other items.

Figure 7:
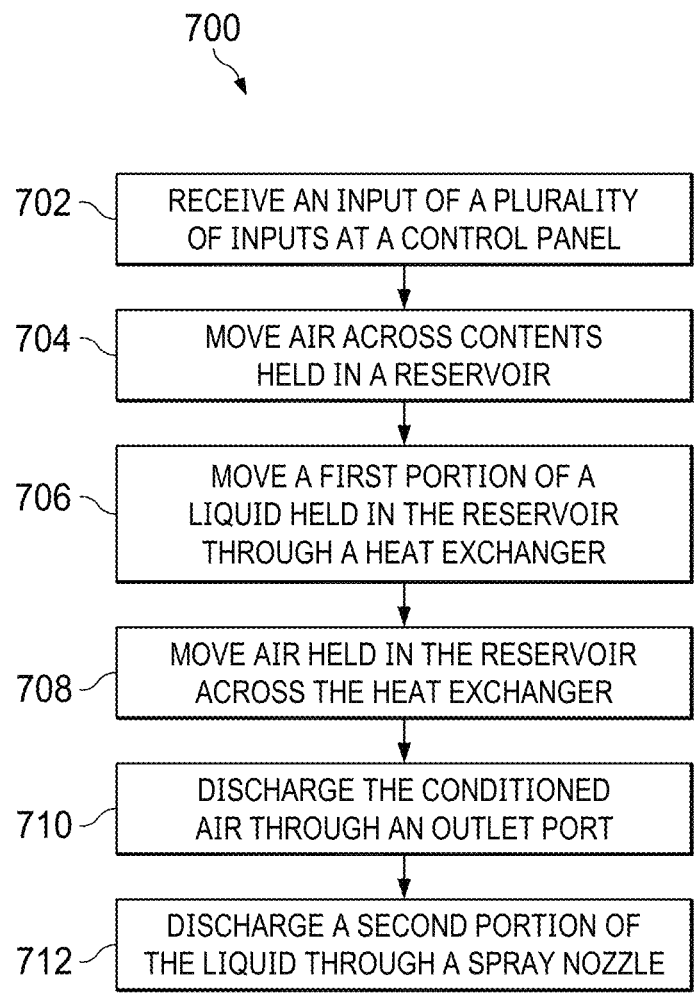
FIG. 7 is an illustrative method relating to conditioning air in all environments using a portable multi-function air conditioner, in accordance with an example of the present disclosure.

FIG. 7 is an illustrative method 700 relating to conditioning air in all environments using a multi-function air conditioner, in accordance with an example of the present disclosure. While FIG. 7 illustrates a method according to one example, other examples may omit, add to, reorder, and/or modify any of the operations shown in FIG. 7. The operations of the illustrative method 700 selectively performing a first conditioning function, a second conditioning function, and/or a third conditioning function, among other functions of the portable multi-function air conditioners described herein. The third conditioning function can be performed by performing the first conditioning function and the second conditioning function simultaneously. The selection of the first, second, and third functions can be based on the ambient environment surrounding the chest 101, among other things (e.g., user preferences), explained below.

In some examples, the first conditioning function may be useful in humid environments, where the air is filled with moisture, to remove moisture from the air and to control the temperature of the air. In this situation, the second conditioning function which includes discharging liquid from the spray nozzle, may not be necessary or desirable.

In some examples, the second conditioning function may be useful, for example, in dry environments, where the air lacks humidity and moisture, to spray liquid into the air and increase the humidity of the air. In this situation, the first conditioning function may not be necessary or desirable, if the temperature of the air is comfortable, or the chest 101 is not filled with liquid, or has run out of liquid.

In some examples, the third conditioning function may be useful, for example, in hot/cold and dry environments, where the air lacks humidity and moisture, and where the air is cold or hot, to humidify and control the temperature of the air simultaneously.

Operation 702, in some examples, includes selectively performing the first, second, and/or third functions includes receiving at least one input of a plurality of inputs at a control panel of the portable multi-function air conditioner 100. The at least one input may be provided by a user based on conditions of the ambient environment surrounding the multi-function air conditioner.

In some examples, as shown in FIG. 3, the control panel 326 is housed at least partially within the upper shell 300 and/or the lower shell 302. The control panel 326 allows the user to control the functions and settings of the portable multi-function air conditioner 100. The control panel 326 may include the buttons 328 for selecting various settings, which activate and deactivate various components of the system (e.g., the fan 304, the heat exchanger 218, the spray pump 318, the pump 216, the spray nozzle 220, etc.). The control panel 326 may be accessible from outside the lid 104. In some examples, the control panel 326 is accessible when the lid 104 of the chest 101 is opened. The control panel 326 may also be located in the body 102 of the chest. The control panel 326 can be integrated into the chest 101. It is understood that the control panel 326 is not limited to buttons. Other types of switches may provide similar control (e.g., rotary knobs, switches, rocker and/or toggle switches, etc.). The control panel 326 may act as a variable switch between the battery 322 and the fan 304 to provide varying amounts of power or current via power connections 232 to the various components. In this regard, the control panel 326 is capable of functioning as a switch between the battery 322 and the various components. However, the control panel 326 may also function as part of a relay circuit. In some examples, the control panel 326 and/or the battery 322 may provide a level of power or current to the pumps and fan to keep the system operating efficiently and to continuously provide the heat exchanger with chilled or heated liquid. In some examples, the control panel 326 may also selectively control the speed of the pump 216 and the spray pump 318.

The control panel 326 may be operable remotely or via a corded controller, rather than at the chest 101. The wired remote 402 can control the multiple functions. Furthermore, in some examples, the wireless remote 404 can control the multiple functions, employing a wireless communication technology. The wired remote 402 and the wireless remote 404 can be used instead of or in addition to the control panel 326. Remote operation allows a user to control the system without having to be nearby, or without having to fully divert attention away from another task.

Operation 704, in some examples, includes moving air across contents held in the reservoir 103. This operation may be performed using the fan 304. In some examples, warm air is drawn into the reservoir 103 of the portable multi-function air conditioner 100 by the fan 304 through the at least one inlet 118. The at least one inlet 118 can be located at the conjunction of the lid 104 and the body 102. Such a location may allow the at least one inlet 118 to be hidden from plain view and allows air to enter the chest 101 even when a substantial amount of ice, liquid, food, drinks, or other objects are located in the reservoir 103. As air moves across these cold objects and cold liquid, the temperature of the warm air begins to decrease, before continuing throughout the rest of the system.

In some examples, the at least one inlet 118 may be configured to allow air to enter the chest 101 when suction force is applied by the system (e.g., when a fan is pulling air from within the chest 101) but prevents air from exiting the chest 101 when the suction force subsides (e.g., when the fan is off). In this sense, the inlet 118 may act as a one-way valve. Inlets 118 of this nature ensure that cold air within the chest 101 does not escape, increasing the time it takes for ice within the chest 101 to melt.

Operation 706, in some examples, includes moving a first portion of liquid held in the reservoir 103 through the heat exchanger 218. The pump 216 described above with respect to FIG. 2 can move cool liquid (e.g., water) from the reservoir 103 through the liquid conduit 222, through the heat exchanger intake conduit 224, and into and through the heat exchanger 218. The cool liquid can thereby cool fins of the heat exchanger 218, the fins allowing for heat transfer to occur between the heat exchanger 218 and air passing across it After the cool liquid passes through the heat exchanger 218 it may return to the reservoir 103 by way of the return conduit 230.

Operation 708, in some examples, includes moving air held in the reservoir 103 across the heat exchanger 218 using the fan 304 to condition the air. In some examples, the 304 is housed between the upper shell 300 and the lower shell 302. The fan 304 may be positioned in close proximity to the heat exchanger 218, so that the fan can draw/push air from within the reservoir 103 across the heat exchanger 218. As air passes across the heat exchanger 218, the air will lose heat to the fins, due temperature difference between the heat exchanger 218 and the air Operation 710, in some examples, includes discharging the conditioned air through the outlet port 120 in the multi-function air conditioner using the fan 304. The outlet port 120 may be defined by other components of the chest 101 or the lid 104 and may be positioned in different positions than shown. In some examples, the outlet port 120 may be located on an upper portion of a side of the chest 101 to direct air laterally outwards at a subject positioned nearby. The outlet port 120 may take a variety of forms depending on where it is desirable to direct the conditioned air. As shown in FIG. 1, the outlet port 120 may be curved such that the conditioned air is directed across the top of the lid 104. In some examples, it may be desirable to direct the conditioned air upwards or laterally away from the lid 104.

Operation 712, in some examples, includes discharging a second portion of the liquid through the spray nozzle 220 using at least one pump. For example, the cooled liquid drawn up through the liquid conduit 222 can also run through the spray nozzle conduit 226 to be discharged through the spray nozzle 220. In some examples, the spray pump 318, such as a high-pressure pump, can move the liquid from the liquid conduit 222 and the spray nozzle conduit 226 out of the spray nozzle 220. In some examples, the spray pump 318 can be situated in the compartment 319 recessed in the lid 104. The spray nozzle 220 is configured to spray a mist of cooled liquid. In some examples the spray nozzle conduit 226 runs out the outlet port 120 and through the flexible tube 122 to a distal tip of the flexible tube 122. In some examples, like the flexible tube 122, the spray nozzle conduit 226 can expand and retract, with the expansion and retraction of the flexible tube 122 when the flexible tube is disconnected from either the air shaft 312 or the outlet port 120. In other examples, the spray nozzle conduit 226 exits the chest 101 from a different outlet port than the outlet port 120. The spray nozzle 220 may be fixed and centered about the circumference of the flexible tube 122. Centering the spray nozzle 220 about the circumference of the flexible tube 122 may ensure that the sprayed liquid is projected symmetrically and evenly outward when coupled with the stream of air flowing through the flexible tube 122. In some examples, the spray nozzle 220 may be fixed to a side of the flexible tube 122. The spray nozzle 220 may extend beyond the distal tip of the flexible tube 122 or may stop short of the end of the distal tip of the flexible tube 122 such that it is hidden from view. When the spray nozzle 220 extends through the flexible tube 122 and/or is fixed to a distal end of the flexible tube 122, it prevents excess liquid from getting stuck within the flexible tube 122, thereby minimizing mold, mildew, and other difficulties resulting from stagnant liquid in a confined space. In some examples, the spray nozzle conduit 226 need not run through the flexible tube 122 and can be positioned separate from the flexible tube 122 such that the air in the flexible tube 122 and the sprayed liquid from the spray nozzle 220 can be routed in different directions.

In some examples, the speed of the fan 304 is variable. The speed of the fan 304 may have three or more speed settings, for example, a low speed setting, a medium speed setting, and a high speed setting. Additionally, the fan 304 may be set to blow air for a certain period of time, for example, 1 minute, 5 minutes, 10 minutes, 15 minutes, 30 minutes, 45 minutes, 1 hour, etc. In some examples, the rate of cooling of the air performed by the heat exchanger 218 is variable. For instance, the button(s) 328 on the control panel 326 can activate an "extreme cool" setting to increase the air conditioning capabilities and maximize the difference in temperature of the air discharged from the chest compared to the ambient temperature. When the "extreme cool" setting is activated, the pump 216 may be engaged. When the pump 216 is engaged, the rate at which the heat exchanger circulates cool liquid through the heat exchanger 218 may be increased or maximized, thereby increasing the amount of heat transferred from the air and into the surface area on the heat exchanger 218. When "extreme cool" is not needed or not desired, the "extreme cool" setting can be deactivated and the rate at which the pump 216 pulls in cool liquid into the heat exchanger 218 may be lowered or stopped. When the heat exchanger 218 cycles through the cool liquid at a slower rate, the air will not be cooled to the same degree. However, using less or none of the cooled liquid in the chest 101 will lengthen the amount of time that any ice stays frozen or cold objects remain cold. In some examples, the rate of cooling is selectable with a dial or there may be any number of cooling settings. The variability and versatility of these and other aspects of the portable multi-function air conditioner 100 all for function and successful use in all climates and environments.

The portable multi-function air conditioner described herein is not limited to the first, second, and third functions of the method 700. Various settings, states, and ambient environments give way to other functions according to the systems and methods described herein. Certain combinations of the features of the portable multi-function air conditioner 100 result in other functions that may be best suited for particular environments. For example, functions which include heating the air, functions that charge devices, functions that keep contents within the chest 101 insulated, functionalities that emit scents and other chemicals (e.g., bug spray, sunscreen, etc.) into the environment.

Some of the examples described herein discuss using cool liquid within a chest to further cool air that has already been cooled by the presence of ice, cool liquid, or other cold objects within the chest. However, it is understood that, in other examples, hot liquid may be used to heat air that has already been heated by hot liquid or other hot objects within the chest.

The versatility and many functions of the portable multi-function air conditioner 100 makes it capable of use in all environments. The portable multi-function air conditioner 100 is able to remove humidity from the air within the reservoir 103 before discharging the air outwards. Removing the humidity from the air using the heat exchanger 218 is particularly beneficial in humid environments. Discharging cold and dry air towards a person or animal counteracts provides relief from the dangers of hot and humid environments. Other environments, such as hot and dry environments arise, where the portable multi-function air conditioner 100 is able to condition the air (e.g., change temperature) using a variety of methods and further condition the air (e.g., add humidity) as it is being discharged, by use of the spray nozzle 220. The spray produced by the spray nozzle 220 can also be used separately from the function wherein the temperature of the air is changed, in situations where the air temperature in the environment is comfortable, but further humidity is desired. These abilities, coupled with the additional functionality and features described herein, allow for use of the portable multi-function air conditioner in all environments.

In the description, specific details have been set forth describing some examples. Numerous specific details are set forth in order to provide a thorough understanding of the examples. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure.

Elements described in detail with reference to one example, example, implementation, or application optionally may be included, whenever practical, in other examples, implementations, or applications in which they are not specifically shown or described. For example, if an element is described in detail with reference to one example and is not described with reference to a second example, the element may nevertheless be claimed as included in the second example. Thus, to avoid unnecessary repetition in the foregoing description, one or more elements shown and described in association with one example, implementation, or application may be incorporated into other examples, implementations, or application unless specifically described otherwise, unless the one or more elements would make an example or implementation non-functional, or unless two or more of the elements provide conflicting functions. Similarly, it should be understood that any particular element, including a system component or a method process, is optional and is not considered to be an essential feature of the present disclosure unless expressly stated otherwise.

Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure. In addition, dimensions and temporal relationships provided herein are for providing specific examples and it is contemplated that different sizes, dimensions, relationships and/or ratios may be utilized to implement the concepts of the present disclosure. To avoid needless descriptive repetition, one or more components or actions described in accordance with one illustrative example can be used or omitted as applicable from other illustrative examples. For the sake of brevity, the numerous iterations of these combinations will not be described separately. For simplicity, in some instances the same reference numbers are used throughout the drawings to refer to the same or like parts.

The methods described herein are illustrated as a set of operations or processes. Not all of the illustrated processes may be performed in all examples of the methods. Additionally, one or more processes that are not expressly illustrated or described may be included before, after, in between, or as part of the example processes. In some examples, one or more of the processes may be performed by a controller and/or may be implemented, at least in part, in the form of executable code stored on non-transitory, tangible, computer or machine-readable media that when run by one or more processors may cause the one or more processors to perform one, some, or all of the processes described in relation to the methods herein. Elements illustrated in block diagrams herein may be implemented with hardware, software, firmware, or any combination thereof. One block element being illustrated separate from another block element does not necessarily require that the functions performed by each separate element requires distinct hardware or software but rather they are illustrated separately for the sake of description.

One or more elements in examples of this disclosure may be implemented in software to execute on one or more processors of a computer system such as a controller. When implemented in software, the elements of the examples of the present disclosure are essentially the code segments to perform the necessary tasks. The program or code segments can be stored in a processor readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read only memory (ROM), a flash memory, an erasable programmable read only memory (EPROM); a floppy diskette, a CD-ROM, an optical disk, a hard disk, or other storage device. The code segments may be downloaded via computer networks such as the Internet, Intranet, etc. Any of a wide variety of centralized or distributed data processing architectures may be employed. Programmed instructions may be implemented as a number of separate programs or subroutines, or they may be integrated into a number of other aspects of the systems described herein. In one example, the control system supports wireless communication protocols such as Bluetooth, IrDA, HomeRF, IEEE 802.11, DECT, and Wireless Telemetry.

In some instances, well-known methods, procedures, components, and circuits have not been described in detail so as not to unnecessarily obscure aspects of the examples. While certain exemplary examples of the present disclosure have been described and shown in the accompanying drawings, it is to be understood that such examples are merely illustrative of and not restrictive on the broad disclosure herein, and that the examples of the present disclosure should not be limited to the specific constructions and arrangements shown and described, since various other modifications may occur to those ordinarily skilled in the art.

In view of all the teachings herein, the present disclosure contemplates a variety of different aspects including but not limited to the following:

Consistent with some examples, a portable multi-function air conditioner comprises an insulated reservoir configured to hold a liquid and ice, a lid associated with the reservoir to provide selective access to the reservoir, a heat exchanger, at least one pump configured to move a first portion of the liquid through the heat exchanger as a first function and discharge a second portion of the liquid through a spray nozzle as a second function, a fan configured to move air across the heat exchanger, and discharge the air through an outlet port associated with one of the reservoir or the lid, the discharged air intermingling with the discharged second portion of the liquid to condition the air, and a power supply operatively coupled with and providing power to the at least one pump and the fan.

In some examples, the fan is further configured to move the air across the liquid or the ice held in the reservoir. The at least one pump may comprise a first pump and a second pump, the first pump configured to move the first portion of the liquid through the heat exchanger, the second pump configured to discharge the second portion of the liquid through the spray nozzle.

In some examples, the multi-function air conditioner further comprises a control panel operable by a user to engage and disengage the at least one pump and engage and disengage the fan, depending on an ambient environment around the multi-function air conditioner.

In some examples, the multi-function air conditioner further comprising a flexible tube connected to the outlet port, the flexible tube configured to route the air discharged through the outlet port in a desired direction. The second portion of the liquid may move through a spray nozzle conduit before reaching the spray nozzle, and the spray nozzle conduit may pass through the outlet port and at least a portion of the flexible tube connected to the outlet port. The spray nozzle conduit may be connected to a fixture at a distal end of the flexible tube. The spray nozzle may be removably coupled to the spray nozzle conduit through the fixture.

In some examples, the air conditioner is an ice chest. The ice chest may be configured to cool food items. In some examples, the multi-function air conditioner further comprises at least one inlet located near a conjunction of the reservoir and the lid, the at least one inlet configured to pass air from an ambient environment into the multi-function air conditioner. In some examples, the multi-function air conditioner further comprises at least one filter configured to filter the liquid before the liquid moves through the spray nozzle and/or the heat exchanger.

Consistent with some examples, a method for conditioning air using a portable, multi-function air conditioner having a reservoir and a lid that provides access to the reservoir comprises selectively performing a first conditioning function by moving a first portion of a liquid held in the reservoir through a heat exchanger using at least one pump, moving air across a heat exchanger using a fan, and discharging the conditioned air through an outlet port in the multi-function air conditioner using the fan. The method may further comprise selectively performing a second conditioning function by discharging a second portion of the liquid into the conditioned air from the multi-function air conditioner through a spray nozzle using the at least one pump.

In some examples, the spray nozzle is disposed centrally in an airflow of the conditioned air. In some examples, the method further comprises receiving at least one input of a plurality of inputs at a control panel of the multi-function air conditioner. The at least one input may be provided by a user based on conditions of an ambient environment surrounding the multi-function air conditioner. Performing the first conditioning function may further include moving air across contents of the reservoir.

Consistent with some examples, a multi-function air conditioner having a reservoir for holding a liquid and having a lid providing access to the reservoir is configured to condition air using a first portion of the liquid, discharge the conditioned air through the outlet port as a first function, and discharge a second portion of the liquid through a nozzle into the conditioned air as a second function.

In some examples the system further comprises a first pump operable to flow the first portion of the liquid through a heat exchanger to condition the air, and a second pump operable to flow the second portion of the liquid through the nozzle into the conditioned air. The air conditioner may be an ice chest.

What is claimed is:

1. A portable insulated air-conditioning ice chest comprising:
   an insulated main body configured to hold cold fluid to provide air-conditioning;
   a lid body configured to provide selective access to the insulated main body, the lid body comprising:
   a control panel;
   a fluid pump, the fluid pump in fluid communication with the cold fluid from the insulated main body and controllable by the control panel;
   a heat exchanger configured to condition air passed therethrough by circulating cold fluid from the insulated main body; and
   a power connection configured to provide power to the fluid pump in the lid body from a power source.

2. The portable ice chest of claim 1, wherein the fluid pump is configured to move cold fluid from the insulated main body into the lid body via a conduit.

3. The portable ice chest of claim 2, wherein the fluid pump is controllable via the control panel to pump at least some of the cold fluid into the lid body.

4. The portable ice chest of claim 2, wherein the lid body further comprises a filter positioned along the conduit to filter the cold fluid before the cold fluid reaches the fluid pump.

5. The portable ice chest of claim 2, wherein the conduit includes an opening positioned in a lower portion of the insulated main body.

6. The portable ice chest of claim 1, wherein the lid body houses the control panel, the fluid pump, and the heat exchanger.

7. The portable ice chest of claim 1, wherein the fluid pump is recessed in a compartment of the lid body.

8. The portable ice chest of claim 7, wherein the lid body further comprises a compartment cover removably fixed to the compartment.

9. The portable ice chest of claim 8, wherein the compartment cover is sealed to the compartment via a cover seal to prevent ingress of moisture.

10. The portable ice chest of claim 8, wherein the compartment is accessible from above the lid body when the compartment cover is removed.

11. The portable ice chest of claim 7, further comprising a power supply recessed in the compartment of the lid body.

12. A method for conditioning air via a portable insulated air-conditioning ice chest, the method comprising:
holding cold fluid in an insulated main body;
moving, with a fluid pump disposed in a lid body, cold fluid from the insulated main body to the lid body via a conduit associated with the fluid pump; and
circulating cold fluid from the insulated main body through a heat exchanger to condition air passed therethrough.

13. The method of claim 12, further comprising controlling the fluid pump via a control panel on the lid body.

14. The method of claim 12, further comprising filtering the cold fluid moved from the insulated main body with a filter positioned along the conduit.

15. The method of claim 12, further comprising recessing the fluid pump in a compartment of the lid body.

16. The method of claim 15, further comprising removably fixing a compartment cover to the compartment of the lid body.

17. The method of claim 15, further comprising recessing a power supply in the compartment of the lid body.

18. The method of claim 12, wherein the conduit includes an opening positioned in a lower portion of the insulated main body.

19. A portable insulated air-conditioning ice chest comprising:
an insulated main body configured to hold cold fluid to provide air-conditioning;
a lid body configured to provide selective access to the insulated main body;
a control panel carried by the lid body and accessible from outside the ice chest;
a fluid pump carried by the lid body, the fluid pump in fluid communication with the cold fluid from the insulated main body and controllable by the control panel;
a heat exchanger carried by the lid body and configured to condition air passed therethrough by circulating cold fluid from the insulated main body; and
a power connection carried by the lid body and configured to provide power to the fluid pump and a fan in the lid body from a power source.

20. The portable ice chest of claim 19, comprising the fan carried by the lid body, the fan configured to flow air through the heat exchanger and controllable by the control panel carried by the lid body.

* * * * *